(12) United States Patent
Maki et al.

(10) Patent No.: US 7,135,213 B2
(45) Date of Patent: Nov. 14, 2006

(54) TEARABLE ELASTIC COMPOSITE ARTICLE AND METHOD OF MANUFACTURE

(75) Inventors: Robert J. Maki, Hudson, WI (US); David P. Swanson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 109 days.

(21) Appl. No.: 10/632,070

(22) Filed: Jul. 31, 2003

(65) Prior Publication Data

US 2005/0025937 A1 Feb. 3, 2005

(51) Int. Cl.
*B32B 3/10* (2006.01)

(52) U.S. Cl. .................. 428/43; 428/172; 442/329

(58) Field of Classification Search .......... 428/43, 428/172; 442/327, 329
See application file for complete search history.

(56) References Cited

U.S. PATENT DOCUMENTS

| | | | |
|---|---|---|---|
| 3,485,706 A | 12/1969 | Evans | 161/72 |
| 3,486,168 A | 12/1969 | Evans et al. | 161/169 |
| 3,493,462 A | 2/1970 | Bunting, Jr. et al. | 161/169 |
| 3,494,821 A | 2/1970 | Evans | 161/169 |
| 3,508,228 A | 4/1970 | Bishop | 340/174.1 |
| 3,575,782 A | 4/1971 | Hansen | 161/141 |
| 4,984,584 A | 1/1991 | Hansen et al. | 128/898 |
| 5,016,331 A | 5/1991 | Dilo | 28/115 |
| 5,496,603 A | 3/1996 | Riedel et al. | 428/40 |
| 5,620,779 A | 4/1997 | Levy et al. | 428/167 |
| 6,383,958 B1 | 5/2002 | Swanson et al. | 442/151 |
| 2002/0119722 A1 | 8/2002 | Welch et al. | 442/382 |

FOREIGN PATENT DOCUMENTS

| | | |
|---|---|---|
| EP | 0 548 609 A1 | 6/1993 |
| WO | WO 95/06449 | 3/1995 |
| WO | WO 97/04154 | 2/1997 |
| WO | WO 00/20200 A1 | 4/2000 |
| WO | WO 00/78883 A1 | 12/2000 |

*Primary Examiner*—Alexander S. Thomas
(74) *Attorney, Agent, or Firm*—Nancy M. Lambert

(57) ABSTRACT

An elastic composite article and methods of manufacturing the same are disclosed. The elastic composite article includes a pair of coverwebs, a plurality of elastic filaments located between the pair of coverwebs. One or both of the pair of coverwebs is a nonwoven fibrous coverweb with a tear pattern of weakened areas formed therein. The tear patterns are formed before the coverwebs are attached to each other to form the elastic composite article.

32 Claims, 2 Drawing Sheets

TEARABLE ELASTIC COMPOSITE ARTICLE AND METHOD OF MANUFACTURE

FIELD OF THE INVENTION

The present invention relates to the field of elastic composite articles. More particularly, the present invention provides a tearable elastic composite article and methods of manufacturing the same.

BACKGROUND

Elastic sheet articles may find a variety of uses as, e.g., backings for tapes, mechanical fasteners, etc. Some elastic sheet articles are provided as composites of two coverwebs with elastic filaments located between the coverwebs. When the two coverwebs are attached to each other while the elastic filaments are stretched, the finished composite exhibits elasticity if, e.g., the elastic filaments are allowed to relax after the coverwebs are attached to each other.

Some elastic composite articles are provided with cohesive materials to form cohesive elastic composite articles such as those described in U.S. Pat. No. 3,575,782 (Hansen) and U.S. Pat. No. 4,984,584 (Hansen et al.), and those marketed under the tradenames COBAN and VETRAP by 3M (St. Paul, Minn.). Cohesive elastic composite articles are commonly used to provide compressive support for injuries or to hold compresses, medicated pads and the like in place on a human or an animal. The cohesive elastic composite articles preferably do not stick to skin or a variety of other materials (e.g., compresses, medicated pads, etc.) but will cohesively bond to other layers of the cohesive elastic composite article with sufficient force to hold the contacting layers together against reasonably high shearing forces.

To use the cohesive elastic composite article, a portion of the desired length may be unrolled and separated from the remainder of the composite remaining on the roll. Separation of the elastic composite article can occur before or after the elastic composite article is applied to an individual. Although the elastic composite articles may exhibit relatively straight tear characteristics in the down-web or machine direction, the elastic composite articles exhibit much less desirable tear characteristics in the cross-web or cross-machine direction.

Attempts to tear the elastic composite articles in the cross-web direction can result in jagged or uneven tear lines that extend over a significant distance in the down-web direction as well as in the cross-web direction. Such tear properties are undesirable. As a result, users typically resort to scissors or other cutting tools when separating lengths of elastic composite article from a roll of the elastic composite article. The use of a tool may require the user to let go of the unrolled elastic composite article and/or the roll of elastic composite article.

One attempt to provide desirable cross-web tear characteristics in cohesive elastic composite article materials involves the use of woven or knitted coverwebs. The woven or knitted coverwebs are, however, more expensive than nonwoven coverwebs. As a result, a cohesive elastic composite article including one or more woven or knitted coverwebs is more expensive than a comparable elastic composite article using only nonwoven coverwebs. Another potential disadvantage is that the woven or knitted coverweb may undesirably increase the force required to tear the elastic composite article in the cross-web direction and/or undesirable stiffen the elastic composite article.

Another attempt to provide desirable cross-web tear characteristics in a cohesive elastic composite article involves the addition of a scrim layer (e.g., woven or knitted scrim) that includes fibers or filaments extending in the cross-web direction. The addition of a scrim layer, however, can increase the cost of the elastic composite article and may adversely affect the flexibility or conformability of the elastic composite article, as well as its breathability. Another potential disadvantage is that the scrim may undesirably increase the force required to tear the elastic composite article in the cross-web direction.

Another attempt at providing cross-web tear characteristics to an elastic composite article involves the use of cross-web lines of perforations, with the cross-web lines of perforations located at intervals along the down-web length of the elastic composite article as described in, e.g., International Publication WO 95/06449. The lines of perforations are formed through the entire elastic composite article after it has been assembled.

SUMMARY OF THE INVENTION

The present invention provides elastic composite articles that exhibit improved cross-web tear characteristics. The elastic composite articles include a pair of coverwebs attached to each other and a plurality of elastic filaments located between the pair of coverwebs. At least one coverweb in the elastic composite article is a nonwoven fibrous coverweb that includes a tear pattern formed therein.

In contrast to the known approaches of providing an elastic composite article with desirable cross-web tear characteristics that include a woven/knitted coverweb or scrim layer to provide desirable cross-web tear characteristics, the articles of the present invention include at least one nonwoven fibrous coverweb including a tear pattern that, itself, typically does not possess good cross-web tear characteristics. As a result, it may be surprising that the resulting elastic composite articles incorporating such coverwebs exhibit improved cross-web tear characteristics. Further, it may be preferred that the elastic composite articles of the present invention be free of any woven or knitted webs.

The cross-web tear characteristics of a nonwoven coverweb including a tear pattern typically improve as the total weight of the web increases. Surprisingly, however, even though the cross-web tear characteristics of a lighter total weight nonwoven coverweb alone are not particularly good, the cross-web tear characteristics of an elastic composite article using such a lighter total weight nonwoven coverweb can still show significant improvements in the cross-web tear characteristics. That result is surprising because the lower tensile strength of the lighter total weight coverwebs would typically lead one of ordinary skill in the art to expect the lighter total weight coverweb to exert less influence on the cross-web tear characteristics of the elastic composite article as a whole. Furthermore, the use of lighter total weight coverwebs may be advantageous if the stiffness and breathability of the elastic composite article are concerns.

In one aspect, the present invention provides an elastic composite article having a width, and a length greater than the width of the article. The article further includes a nonwoven fibrous first coverweb having a down-web direction aligned with the length of the article and a cross-web direction transverse to the down-web direction; a tear pattern in the form of a plurality of separate and distinct weakened areas formed in the first coverweb; a second coverweb attached to the first coverweb; and a plurality of elastic filaments located between the first coverweb and the second coverweb, the plurality of elastic filaments aligned along the length of the article, wherein each elastic filament of the plurality of elastic filaments extends continuously over the entire length of the article.

In another aspect, the present invention provides an elastic composite article having a width and a length greater than the width of the article. The article further includes a nonwoven fibrous first coverweb having a down-web direction aligned with the length of the article and a cross-web direction transverse to the down-web direction; a tear pattern in the form of a plurality of separate and distinct weakened areas formed in the first coverweb, wherein the tear pattern includes a plurality of rows of the weakened areas distributed along the down-web direction of the first coverweb, wherein each row of the weakened areas extends in the cross-web direction across the first coverweb; a nonwoven fibrous second coverweb; a plurality of elastic filaments extending in a direction along the length of the article, the plurality of elastic filaments located between the first coverweb and the second coverweb, wherein each elastic filament of the plurality of elastic filaments extends continuously over the entire length of the article; and binder impregnating the first coverweb and the second coverweb; wherein the article is free of any woven or knitted webs.

In another aspect, the present invention provides a method of manufacturing an elastic composite article having a width and a length greater than the width of the article. The method includes providing a nonwoven fibrous first coverweb having a down-web direction aligned with the length of the article and a cross-web direction transverse to the down-web direction, wherein the first coverweb includes a tear pattern in the form of a plurality of separate and distinct weakened areas in the first coverweb; providing a second coverweb; locating a plurality of elastic filaments between the first coverweb and the second coverweb after providing the plurality of weakened areas in the first coverweb, wherein each elastic filament of the plurality of elastic filaments extends continuously in a direction along the length of the article; and attaching the first coverweb to the second coverweb after forming the tear pattern in the first coverweb and after locating the plurality of elastic filaments between the first coverweb and the second coverweb.

These and other features and advantages of the present invention may be described below in connection with various illustrative embodiments of the invention.

DETAILED DESCRIPTION OF ILLUSTRATIVE EMBODIMENTS OF THE INVENTION

Figure 1:
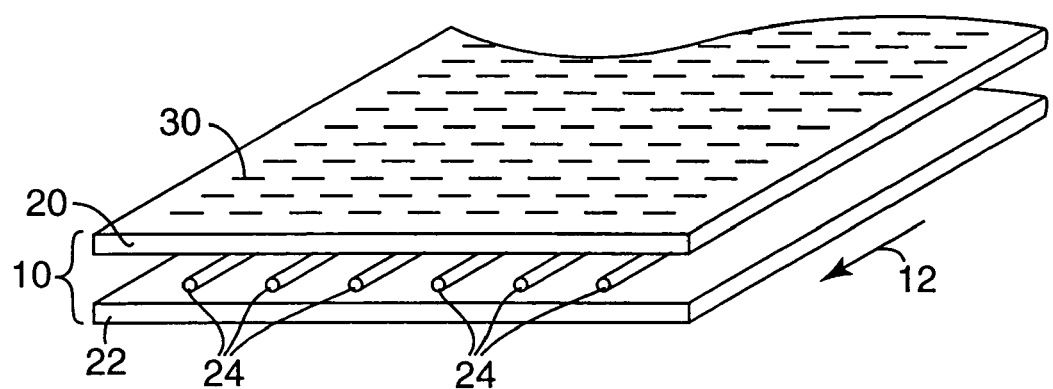
FIG. 1 is an exploded edge view of one illustrative elastic composite article according to the present invention.

In the following detailed description of illustrative embodiments, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

One illustrative elastic composite article 10 according to the present invention is depicted in FIG. 1 and includes a first coverweb 20, second coverweb 22 and elastic filaments 24 located between the two coverwebs 20 and 22. At least one of the coverwebs 20 & 22 is a nonwoven fibrous web including a tear pattern in the form of weakened areas. In some instances, coverwebs 20 and 22 may both be nonwoven fibrous webs. Alternatively, only one of the coverwebs may be a nonwoven fibrous web. For example, one of the coverwebs may be, e.g., a film, a composite of film and nonwoven web, etc. The first coverweb 20 may be the same as the second coverweb 22 or, alternatively, the coverwebs 20 & 22 may be of different weights, be made of different materials, and/or be manufactured by different processes.

The term "nonwoven" as used herein means a web formed by a collection of shorter fibers and/or longer filaments (which will be collectively referred to as fibers herein for convenience) that are bound together without being knitted or woven. Fibers in a nonwoven web may be laid down, collected, deposited, etc. in a mat. It may be preferred that the fibers used in one or both of the nonwoven coverwebs may be preferentially aligned in the down-web or machine direction 12 by, e.g., carding or other processes. Binding of the fibers may be performed using a binder, thermally, etc., provided that the binding process does not use weaving or knitting.

Nonwoven webs may be formed using a variety of processes such as melt blowing, spun bonding processes, carding, needle punched web making processes, air laid web making processes, wet laid web making processes, film aperturing processes, staple fiber carding processes, hydrodynamic entanglement, etc. Hydrodynamic entanglement is described in, e.g., U.S. Pat. Nos. 3,485,706; 3,486,168; 3,493,462; 3,494,821 and 3,508,228. Another method of forming a nonwoven web is needle-tacking as described in, e.g., U.S. Pat. No. 5,016,331.

The total weight of nonwoven coverwebs used in elastic composite article 10 may be, e.g., 50 grams per square meter (gsm) or less per coverweb. Further limits on the total weight of the coverwebs may be beneficial, especially for coverwebs that include a tear pattern formed therein. The weakened nonwoven coverwebs used in elastic composite articles of the present invention may have a total weight (per coverweb) of, e.g., 20 gsm or less, even 15 gsm or less, and even 10 gsm or less.

The nonwoven coverwebs used in connection with the present invention may include a binder (in addition to the fibers) to enhance bonding of the individual fibers within the nonwoven coverwebs. Selection of a suitable binder (i.e., one which has a suitable affinity for the fibers of the nonwoven web) is well within the judgment of one skilled in the art. Briefly, however, binders for nonwoven fabrics may be selected from materials including, but not limited to, homopolymer and copolymer latexes of acrylics, butadienes, styrene/butadiene rubber copolymers, urethanes, vinyl acetates, vinyl acetate/acrylate copolymers, vinyl acetate/ethylene copolymers, polyvinyl alcohols, polyvinyl chlorides, vinyl esters, vinyl ethers, natural rubber, neoprene, etc.

The nonwoven coverwebs may include fibers (e.g., thermoplastic fibers) to enhance the strength of the nonwoven web. For example, incorporating fibers that include thermoplastic materials may be used to thermally bind fibers in a nonwoven web, preferably by melt-bonding to the other fibers in the web without substantially weakening the web. Binder fibers are available in a wide variety of configurations including, e.g., totally meltable binder fibers, side-by-side binder fibers, bicomponent binder fibers, elliptical core-sheath binder fibers, concentric core-sheath binder fibers, and combinations thereof.

The elastic filaments 24 in elastic composite articles of the present invention may be aligned with the down-web or machine direction (as indicated by arrow 12—it being understood that the cross-web direction is generally perpendicular to the down-web direction). The elastic filaments 24 may be arranged in between the nonwoven coverwebs 20 & 22 with a spacing of 1–22 filaments per centimeter (cm) in the cross-web direction, alternatively a spacing of 1–20 filaments/cm in the cross-web direction, and even a spacing of 1–10 filaments/cm in the cross-web direction. The elastic filaments may have a size in the range of 80–800 denier, possibly 200–500 denier.

The elastic filaments 24 exhibit the ability to stretch from their original length upon application of a force and yet substantially recover to their original length upon release of the force. Examples of some suitable materials for the elastic filaments include, but are not limited to natural rubber, synthetic rubber or thermoplastic polymers. Suitable synthetic rubbers may include ether-based polyurethane Spandex, ester-based polyurethane Spandex, SBR styrene butadiene rubber, EPDM ethylene propylene rubber, fluororubbers, silicone rubber and NBR nitrile rubber. Suitable thermoplastic elastomers for use as in the elastic filaments may include block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The block copolymers may be, for example, (polystyrene/poly(ethylene-butylene)/polystyrene) block copolymers available from the Shell Chemical Company under the name KRATON. Other suitable elastic filaments may be made of polyurethane elastomeric materials, polyamide elastomeric materials, and polyester elastomeric materials.

The elastic composite articles of the present invention include two coverwebs 20 & 22 attached to each other, with elastic filaments 24 located between the coverwebs. The coverwebs 20 & 22 may be attached by any suitable technique or combination of techniques that are compatible with the coverwebs being used. For example, the coverwebs 20 & 22 may be thermally attached, adhesively attached, etc.

In some instances where, e.g., both coverwebs 20 & 22 include fibrous nonwoven layers, the coverwebs 20 & 22 may be attached by impregnating their respective fibrous nonwoven layers with a binder in a manner similar to that used to manufacture a nonwoven web. The impregnating may be accomplished by spraying, printing coating, or otherwise applying the binder (in the form of, e.g., liquid, particulates, etc.) such that the binder enters into the interstices between fibers in the nonwoven webs 20 & 22. The impregnating may be followed by, e.g., drying, curing etc. to complete attachment of the coverwebs. Selection of a suitable binder (i.e., one which has a suitable affinity for the fibers of the nonwoven webs) is well within the judgment of one skilled in the art. Briefly, however, binders for elastic composite articles may be selected from materials including, but not limited to, homopolymer and copolymer latexes of acrylics, butadienes, styrene/butadiene rubber copolymers, urethanes, vinyl acetates, vinyl acetate/acrylate copolymers, vinyl acetate/ethylene copolymers, polyvinyl alcohols, polyvinyl chlorides, vinyl esters, vinyl ethers, natural rubber, neoprene, etc.

If the elastic composite article is to be used as a cohesive elastic composite article, it may be preferred to impregnate the coverwebs with a cohesive binder material. Concentrated natural rubber latex is one suitable cohesive binder material, although other elastomers or blends of elastomers having similar properties may be used, e.g., tackified neoprene, styrene butadiene rubber, polyurethanes, etc. After applied and dried or cured, the cohesive binder material may present a slightly tacky feel. The cohesive binder material may not adhere to skin, but may cohesively bond to itself with sufficient force to hold contacting layers of the cohesive elastic composite article together against reasonably high shearing stresses.

To improve the cross-web tear characteristics of the elastic composite article 10, at least one of the coverwebs 20 & 22 is a nonwoven fibrous coverweb that includes a tear pattern formed therein. In the depicted embodiment, first coverweb 20 includes a pattern of weakened areas 30 formed therein. The tear pattern may include weakened areas 30 that are aligned across the coverweb 20 in the cross-web direction to form rows or lines of weakened areas 30 across the coverweb 22 in the cross-web direction.

The weakened areas 30 may take the form of, e.g., embossed areas or perforations. For example, the weakened areas 30 can take the form of embossed areas in which the fibrous nonwoven coverweb is processed under conditions of, e.g., temperature, pressure, etc., that weaken the tensile strength of the coverweb across the weakened areas. Embossed areas may be provided by, e.g., embossing rolls, ultrasonic energy, laser energy, flame embossing, etc., and combinations thereof. Regardless of the precise technique or techniques used to form the embossed areas, the coverweb is processed such that fibers running through the weakened area are crushed, melted, broken, fractured, or otherwise permanently deformed such that the tensile strength of the coverweb across the weakened area is reduced relative to a similar area of the coverweb that is not embossed.

Another form that the weakened areas 30 may take are perforations (e.g., slits, voids, etc.) in which fibers extending through the weakened area 30 are cut, slit, fractured, etc. In some instances the perforations may involve removal of a portion of the coverweb, while in others substantially none of the coverweb is removed in the weakening process.

Although the tear pattern of weakened areas 30 may be useful to improve the cross-web tear characteristics of the elastic composite articles of the present invention, a balance may need to be made between improving the tear characteristics and weakening the down-web tensile strength of the elastic composite articles. If, for example, the elastic composite articles are to be used as cohesive elastic composite articles that must be stretched to provide compression to, e.g., limbs, etc., excessive weakening of the tensile strength of the composite may undesirably limit the compression that may be achieved using the elastic composite articles of the present invention. It may be that, for cohesive elastic composite articles of the present invention, the down-web tensile strength per unit cross-web width of the composite be 1 kilogram per centimeter (kg/cm) (5.5 pounds/inch) or more, even 1.25 kg/cm (7 pounds/inch) or more, and even 1.5 kg/cm (8.3 pounds/inch) or more. If, however, the elastic composite articles are to be used as, e.g., tape backings, mechanical fastener backings, or other articles, the tensile strength may be higher or lower than the exemplary values provided above for cohesive elastic composite articles.

Figure 2:
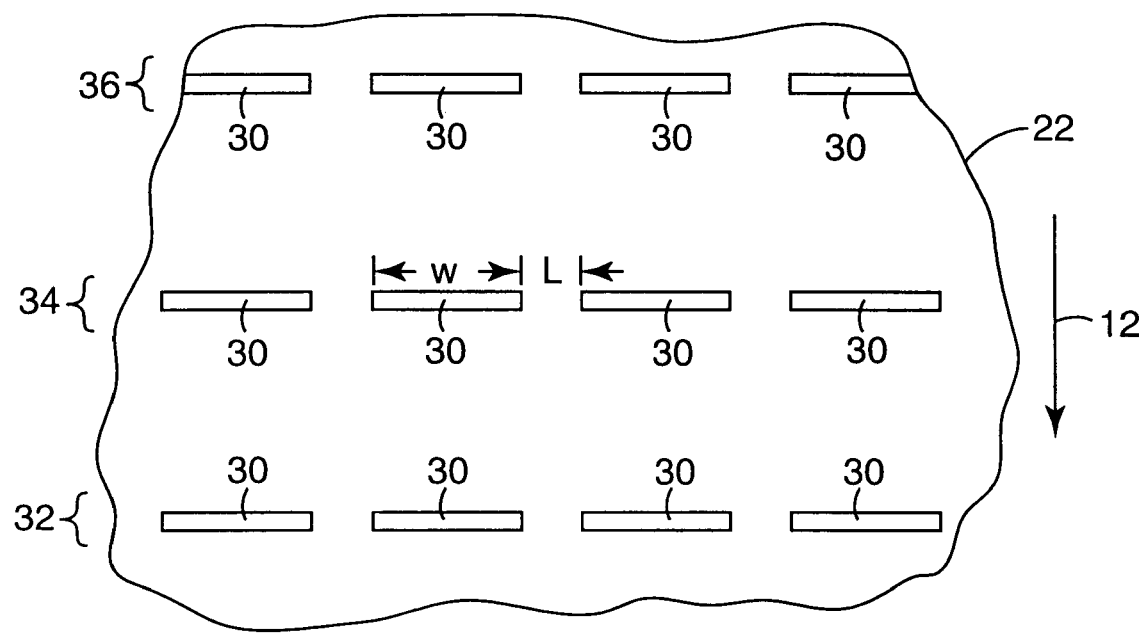
FIG. 2 is an enlarged plan view of a portion of one illustrative pattern of weakened areas that may be used in connection with a nonwoven coverweb used in an elastic composite article according to the present invention.

FIG. 2 is an enlarged view of a portion of one coverweb 22 depicting one exemplary pattern of weakened areas 30 formed therein. If the weakened areas 30 are provided in a pattern that defines what are essentially cross-web lines of weakened areas 30, the cross-web width (w) of each weakened area 30 and the cross-web width of the land (l) between adjacent weakened areas 30 in each such line may be selected to provide desirable cross-web tear characteristics (where both measurements are in the cross-web direction). For example, the land dimension (l) be 0.5 mm or less. The cross-web width (w) of each weakened area 30 may be 1 mm or less.

In an alternate manner of characterizing the cross-web width of the weakened areas and lands, the ratio of the cross-web width (w) of one weakened area to the cross-web width (l) of the land may be selected to provide desired cross-web tear characteristics. For example, the cross-web width:land ratio may be 1:1 or more, possibly 1.5:1 or more, even 2:1 or more, or even 2.5:1 or more.

Where the weakened areas 30 are arranged in cross-web lines, successive lines of weakened areas 30 (where successive lines are spaced apart in the down-web direction 12) may be aligned in the down-web direction such that a weakened area 30 is aligned with a weakened area 30 in the successive or adjacent line. Referring to FIG. 2, e.g., the weakened areas 30 in line 32 are aligned with the weakened areas 30 in line 34. The land areas in line 34 are also aligned in the down-web direction 12 with the land areas in lines 32 and 36 on opposite sides of line 34. Such a pattern may be referred to with respect to the present invention as an aligned brick pattern. Such alignment presumes that the cross-web width of the weakened areas and lands in each line are the same, but it should be understood that in some instances, the cross-web width of the features in different lines may differ. Also, although the depicted pattern includes weakened areas and lands that are aligned in the down-web direction, the different features may alternatively be offset in the cross-web direction such that corresponding features in successive lines are not aligned with each other.

If the tear pattern includes weakened areas that are arranged to form rows of weakened areas across the coverweb in the cross-web direction, the weakened areas may preferably be separated or spaced apart in the down-web direction along any straight down-web line by a distance of, e.g. 10 millimeters (mm) or less, even 5 mm or less, and even 3 mm or less.

Although the weakened areas 30 are depicted as having a generally rectangular shape, it should be understood that other shapes may be used. Examples of some potentially useful patterns are depicted and described in, e.g., U.S. Pat. No. 6,383,958 (Swanson et al.). The cross-web width, land and ratios of width to land discussed herein may be employed with any alternatively shaped weakened areas as well.

Figure 3:
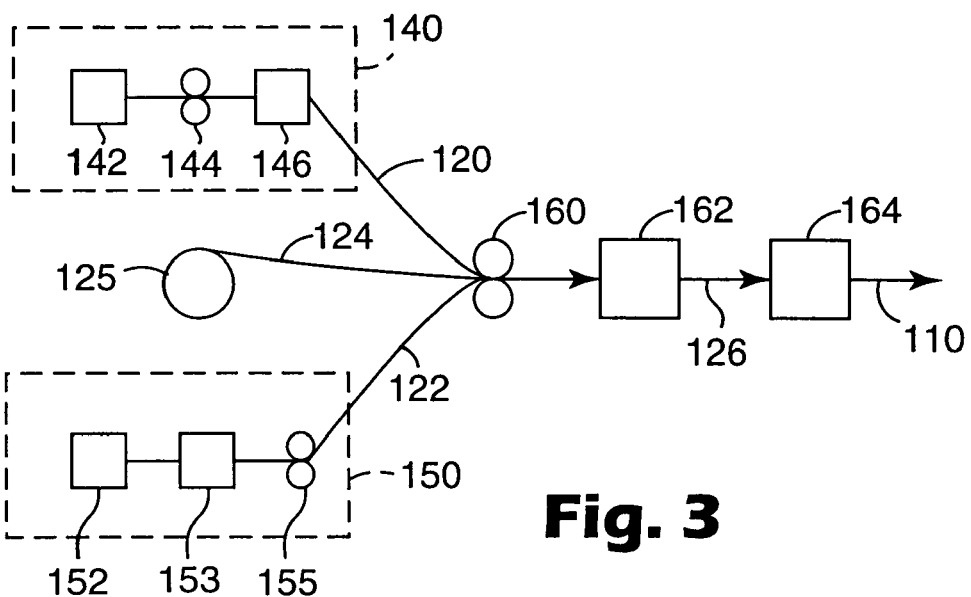
FIG. 3 is a schematic diagram of one illustrative system and method of manufacturing an elastic composite article according to the present invention.

Although a number of different methods may be used to manufacture elastic composite articles of the present invention, one illustrative method and system is depicted in FIG. 3. In the system and method of FIG. 3 two coverwebs 120 & 122 and elastic filaments 124 are fed into an attachment station 160. It may be preferred that the attachment station 160 be overdriven relative to the rate at which the elastic filaments 124 are released from, e.g., roll 125 such that the elastic filaments 124 are elongated or stretched from their relaxed length as they are fed between coverwebs 120 & 122.

If, for example, the attachment station 160 is in the form of a coating station at which a binder is impregnated into any nonwoven fibrous coverwebs used in the elastic composite article, the coverwebs may be impregnated or saturated with a binder solution in station 160 and dried with the elastic filaments 124 still elongated at station 162, followed by heating at station 164 to relax the composite 126, thus providing a shirred elastic composite article 110. Alternate methods of attaching the coverwebs 120 & 122 as described above, may use different attachment techniques than those depicted in connection with the illustrative embodiment of FIG. 3.

Methods of the present invention may involve forming any tear patterns in the coverwebs before the elastic composite articles are assembled with the elastic filaments located between the two coverwebs. A potential advantage of such methods is that none of the elastic filaments in a given elastic composite article are broken or severed by the process of adding the tear patterns to the coverwebs. In some instances, each of the elastic filaments in the elastic composite articles will extend continuously over the entire length of an elastic composite article of the present invention.

FIG. 3 does illustrate some variations that may be employed when manufacturing elastic composite articles according to the present invention. In some instances, one or both of the coverwebs 120 & 122 may be provided as completed webs such that they may simply be, e.g., unwound from a roll and fed into the station 160 with the elastic filaments 124. If provided in roll form, one or both of the coverwebs 120 & 122 may include a tear pattern as supplied, or a tear pattern may be formed therein just before attaching the coverwebs to each other.

Alternatively, however, one or both of the nonwoven coverwebs 120 & 122 may be manufactured in line with the remainder of the process. One system/method 140 that may be used to manufacture coverweb 120 is depicted in FIG. 3 and includes a web forming apparatus 142 in which fibers of the nonwoven are collected or otherwise assembled. The fibrous web is then fed into a weakening station 144 where a tear pattern is formed in the fibrous web, followed by a bonding station in which the fibers are bound together (by, e.g., applying a binder solution, heat bonding, etc.) to complete the nonwoven coverweb 120. In this system/method 140, the tear pattern is formed before the nonwoven fibers are bonded together.

An alternative system/method 150 of manufacturing a nonwoven coverweb 122 is depicted in FIG. 3. The system/method 150 includes a web forming apparatus 152 in which fibers of the nonwoven are collected or otherwise assembled. The fibrous web is then fed into bonding station 153 in which the collected fibers are bound together (by, e.g., applying a binder solution, heat bonding, etc.). Following the bonding station, a tear pattern may be formed in the web at weakening station 155 to complete the nonwoven coverweb 122. In this system/method 150, the tear pattern is formed after the fibrous web is bound together.

It should be noted that FIG. 3 depicts a system/method for manufacturing an elastic composite article that includes two weakened nonwoven coverwebs 120 & 122. If both of the coverwebs 120 and 122 are provided with a tear pattern formed therein, the tear patterns may not be aligned with each other across the thickness of the elastic composite article 110 as they would be if, e.g., the tear pattern was formed after the two coverwebs 120 & 122 were attached to each other. In some instances, however, the tear patterns in the two coverwebs 120 & 122 may be aligned with each other by chance. In other instances, the tear patterns in the two coverwebs 120 & 122 may be aligned with each other by choice, although the tear patterns may still be formed in each coverweb before the elastic filaments are located therebetween. Furthermore, the tear patterns in each coverweb 120 & 122 may be the same or different.

In some embodiments, however, only one of the coverwebs 120 & 122 may include a tear pattern formed therein. In such a situation, one of the coverweb system/methods 140 and 150 may be operated such that a tear pattern is not formed in the coverweb or one coverweb may be supplied on, e.g., a roll, without a tear pattern formed therein and incorporated into the elastic composite article without a tear pattern.

Figure 5:
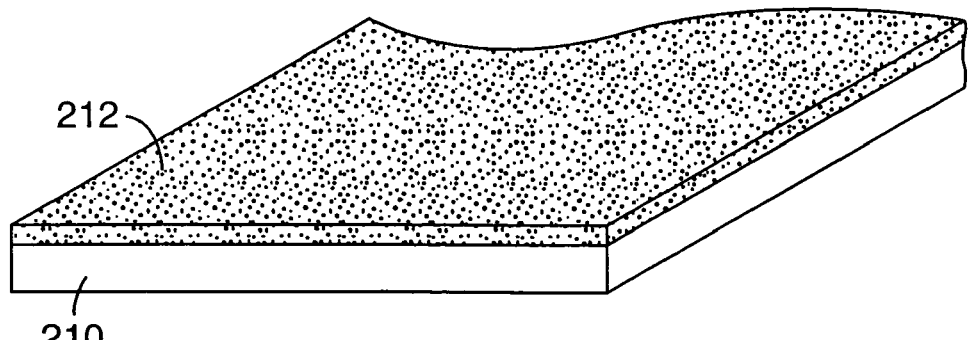
FIG. 5 is a perspective view of an illustrative elastic composite article including a layer of adhesive.

FIG. 5 is a perspective view of an illustrative elastic composite article 210 of the present invention that includes a layer of adhesive 212 on one major surface thereof. The article 210 may include a layer of adhesive on the opposite major surface if so desired. The adhesive, may be any suitable adhesive based on the intended use of the article 210. For example, the adhesive 212 may be a pressure sensitive adhesive if the article is to be used as a pressure sensitive adhesive tape.

TEST METHODS

The following test methods were used to collect data presented in the examples.

Tensile Strength:

ASTM Test Method No. D3759-83 was performed using a Thwing Albert tester (Model EJA/2000, Thwing Albert Company, Philadelphia, Pa.). A sample width of about 2.54 cm (1") in the cross-web direction, a gauge length of 12.7 cm (5") in the down-web direction, and a crosshead speed of 12.7 centimeters per minute (cm/min) (5"/min). Reported value is the maximum force applied to the test sample to obtain the tensile value at point of break.

Coverweb Cross-Web Direction Tear Test:

Samples with a cross-web width of either 5.1 cm (2") or 10.2 cm (4") and 30.5 cm (12") in the down-web or machine direction were tested in the following manner. A sample of the coverweb was held at the center of the 30.5-cm length with the thumb and index finger of each hand spaced no more than 1.3 cm (0.5") apart. The sample was then torn by moving one's hands in opposite directions from one another and perpendicular to the cross-web direction of the sample until the tear had propagated through the other side of the sample. The rate of tear propagation was believed to be about 20 centimeters per second (cm/sec). A ruler was used to measure (in millimeters) the maximum spread that the tear line deviated in the down-web direction relative to a cross-web line (i.e., a line perpendicular to the down-web or machine direction) from the point at which the tear started.

Composite Cross-Web Direction Tear Test:

The tear of the elastic composite articles was tested using the same procedure as defined above for the coverwebs, except that the elastic composite article was stretched to its elastic limit before initiating tear.

EXAMPLES

The following non-limiting examples are provided to illustrate various features of the present invention.

Example 1

Two embossed nonwoven coverwebs were made using a two fiber blend including 80% Wellman T-310 PET 1.5 denier×1.5| (3.8 cm) staple fibers (Wellman, Charlotte, N.C.) and 20% KoSa T-254 Bicomponent 2.0 denier×1.5" (3.8 cm) staple fibers (KoSa, Salisbury, N.C.). The fiber blend was carded to a basis weight of 9 gsm.

The carded fibers were then calendared using a heated metal roll having a plurality of raised protuberances formed thereon. The heated metal roll was forced against a smooth steel backup roll at a nip pressure of 19.0 kilograms per lineal centimeter (kg/cm) (106 pounds per lineal inch (pli)) and a nip speed of 9.5 meters per minute (mpm) (31 feet per minute (fpm)). The heated roll was held at a temperature of 154° C. (310° F.).

Figure 4:
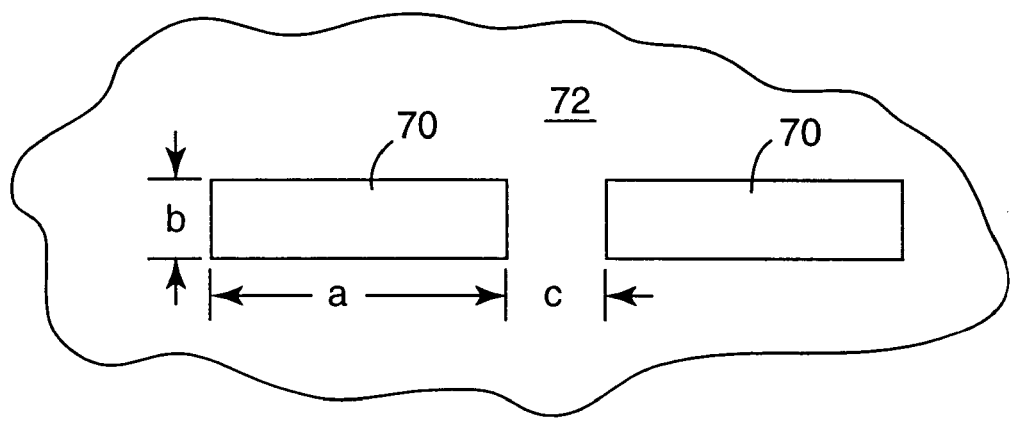
FIG. 4 is a plan view of the top surfaces of two protuberances on an embossing roll used in connection with the elastic composite articles described in the examples.

The heated roll had protuberances formed in a brick pattern with rows of protuberances extending across the roll (in the cross-web direction). Two such protuberances are depicted in FIG. 4. The protuberances 70 extended from a surface 72 and, at the top surface (i.e., the surface that forms an embossed area) each protuberance 70 had a cross-web width (a) of 0.9 mm (36 mils) and down-web length (b) of 0.2 mm (8 mils). The cross-web width (c) of the land distance between adjacent protuberances 70 in each row was 0.25 mm (10 mils). The repeat between successive rows of protuberances was 1.3 mm (50 mils) as measured around the circumference of the roll. The height of the top surfaces of the protuberances 70 above the surface 72 was 0.31 mm (12 mils). The protuberances 70 were formed with sloping sides extending from the top surface down to the surface 72 of the roll such that each protuberance was larger at the surface 72 than at the top surface.

After calendaring, the coverwebs were resin bonded using 2–3 gsm of an acrylic latex binder (B-15H from Rohm & Haas, Charlotte, N.C.), leaving a coverweb with a total weight of 11–12 gsm.

The finished coverwebs were collected and unrolled into a gravure coating station. Elastic filaments were fed into the gravure coating station between the two coverwebs. The elastic filaments (280 denier GLOSPAN polyurethane elastic filaments, Radici Spandex, Gastonia, N.C.) were unwound at a speed of between 1.6 mpm (5.3 fpm) while the gravure coating station (and coverwebs) were driven at a speed of 4.9 mpm (16 fpm). As a result, the elastic filaments are stretched to a draw ratio of 3:1. The filaments were fed into the nip through a comb with a spacing of 10 ends per inch (10 ends per 2.54 cm).

At the gravure coating station, the nonwoven coverwebs with elastic filaments located therebetween was saturated with a 52% solids natural rubber latex solution. Following that, the composite was dried in an oven at 138° C. (280° F.) and collected in stretched form on a roll. The composite was then unwound and directed through an oven to relax the elastic filaments, resulting in a completed elastic composite article capable of elastic stretching.

Example 2

The elastic composite article of Example 2 was prepared in the same manner as Example 1, except that the nonwoven coverwebs were embossed or calendared at a nip pressure of 44.0 kg/cm (246 pli).

Example 3

The elastic composite article of Example 3 was prepared in the same manner as Example 1, except that the nonwoven coverwebs were embossed or calendared at a nip pressure of 68.9 kg/cm (385 pli).

Example 4

The elastic composite article was prepared in the same manner as Example 1, except that the nonwoven coverwebs were embossed or calendared using a roll having protuberances with top surfaces that had different dimensions than those described in connection with Example 1. The dimensions of the top surfaces of the protuberances 70 of FIG. 3 were a cross-web width (a) of 0.76 mm (30 mils) and a down-web length (b) of 0.31 mm (12 mils). The cross-web width (c) of the land distance between adjacent protuberances 70 in each row was 0.51 mm (20 mils). The repeat between successive rows of protuberances was 1.3 mm (50 mils).

Example 5

The process described in connection with Example 1 was used except that the nonwoven coverwebs were smooth roll calendered before they were embossed. The smooth roll calendering was performed using a rubber and steel roll nip with the steel roll heated to a temperature of 154° C. (310° F.) and a nip pressure of 19.0 kg/cm (106 pli) and a nip speed of 9.5 mpm (31 fpm).

Also, the calendar embossing step, i.e., the step in which the embossed areas were formed, was performed at a nip pressure of 44.0 kg/cm (246 pli).

Example 6

The process described in connection with Example 5 was used, except that the coverwebs were formed using a two fiber blend including 70% Wellman T-310 PET 1.5 denier× 1.5" (3.8 cm) staple fibers (Wellman, Charlotte, N.C.) and 30% KoSa T-254 Bicomponent 2.0 denier×1.5" (3.8 cm) staple fibers (KoSa, Salisbury, N.C.). The fiber blend was carded to a basis weight of 9 gsm.

Also, the coverwebs were embossed using an embossing roll having protuberances with dimensions as described in Example 4.

Example 7

The process described in connection with Example 6, except that the embossing was performed at a nip pressure of 68.9 kg/cm (385 pli).

Example 8

The process described in Example 3 was used except that the nonwoven coverwebs were constructed only with Wellman T-310 PET 1.5 denier×1.5" (3.81 cm) fibers carded to a basis weight of 8–9 gsm. Also, the nonwoven webs were resin bonded (at a weight of 2–3 gsm) and dried first, after which they were pattern embossed.

Example 9

The process described in Example 8 was used, except that the calendar embossing was performed at a nip pressure of 44.0 kg/cm (246 pli).

Example 10

The process described in connection with Example 1 was used with the following exceptions.

The first coverweb was manufactured using Wellman T-310 PET 1.5 denier×1.5" (3.8 cm) staple fibers carded to a basis weight of 8–9 gsm. The coverweb was resin bonded using 2–3 gsm of an acrylic latex binder (Rohm & Haas B-15H), leaving a coverweb with a total weight of 10–12 gsm. This coverweb was not embossed with any pattern.

The second coverweb was manufactured using the coverweb process described in Example 1, except that the fiber blend included 90% Wellman T-310 PET 1.5 denier×1.5" (3.8 cm) staple fibers and 10% KoSa T-254 Bicomponent 2.0 denier×1.5" (3.8 cm) staple fibers carded to a basis weight of 8 gsm. Also, the carded fibers were calendar embossed at a nip pressure of 68.9 kg/cm (385 pli).

The finished coverwebs were collected and unrolled into a gravure coating station. The elastic filaments were fed into the gravure coating station between the two coverwebs at a speed of between 2.0 mpm (6.4 fpm) while the gravure coating station (and coverwebs) were driven at a speed of 4.9 mpm (16 fpm). As a result, the elastic filaments are stretched to a draw ratio of 2.5:1.

Example 11

The process of Example 10 was used except that the fibers in the second coverweb were carded to a basis weight of 12 gsm and resin bonded with 3 gsm of the acrylic latex resin, providing a coverweb with a total weight of 15 gsm.

Example 12

The process of Example 10 was used except that the fibers in the second coverweb were carded to a basis weight of 16 gsm and resin bonded with 4 gsm of the acrylic latex resin, providing a coverweb with a total weight of 20 gsm.

Example 13 (Comparative)

Commercially available COBAN product available from 3M, St. Paul, Minn.

TEST RESULTS

The elastic composite articles and embossed coverwebs were tested for cross-web tear characteristics.

Table 1 presents the cross-web tear characteristics of an embossed nonwoven coverweb and an elastic composite article using one or two layers of the embossed nonwoven coverweb. All data in Table 1 was generated using samples with a cross-web width of 5.08 cm (2"). The data presented is the maximum spread observed in the tear line, i.e., the maximum spread that the tear line deviated in the down-web direction relative to a cross-web line (i.e., a line perpendicular to the down-web or machine direction) from the point at which the tear started. All data is an average of three tears on different samples from the same lot.

As seen, the coverwebs of the Examples 1–12 and Comparative Example 13 exhibited substantial spread in the cross-web tear characteristics. All of the samples of elastic composite articles prepared according to Examples 1–12, however, provided lower spread when torn than Comparative Example 13.

TABLE 1

| Example No. | Coverweb Max. Spread (mm) | Composite Max. Spread (mm) |
| --- | --- | --- |
| 1 | 26.3 | 6.33 |
| 2 | 19.0 | 2.67 |
| 3 | 19.0 | 2.33 |
| 4 | 32.0 | 20.33 |
| 5 | 30.0 | 8.33 |
| 6 | 25.7 | 28.00 |
| 7 | 23.3 | 11.33 |
| 8 | 18.0 | 20.00 |
| 9 | 33.0 | 11.00 |
| 10 | 17.3 | 7.00 |
| 11 | 14.7 | 6.33 |
| 12 | 13.3 | 4.33 |
| 13 | 55.7 | 43.00 |

Table 2 presents the cross-web tear characteristics of an embossed nonwoven coverweb and an elastic composite article using one or two layers of the embossed nonwoven coverweb. All data in Table 2 was generated using samples with a cross-web width of 10.2 cm (4"). The data presented is the maximum spread observed in the tear line, i.e., the maximum spread that the tear line deviated in the down-web direction relative to a cross-web line (i.e., a line perpendicular to the down-web or machine direction) from the point at which the tear started. All data is an average of three tears on different samples from the same lot.

Although the embossed nonwoven coverwebs alone exhibited substantial spreads in the tear line, all of the samples of elastic composite articles incorporating the same coverwebs provided improved tear characteristics (i.e., smaller spread). Furthermore, all of the samples prepared according to Examples 1–3 and 9–12 exhibited improved tear characteristics relative to Comparative Example 13.

TABLE 2

| Example No. | Coverweb Max. Spread (mm) | Composite Max. Spread (mm) |
| --- | --- | --- |
| 1 | 114.7 | 21.33 |
| 2 | 42.0 | 6.33 |
| 3 | 55.3 | 15.00 |
| 9 | 54.0 | 17.33 |
| 10 | 40.3 | 22.33 |
| 11 | 46.0 | 13.00 |
| 12 | 37.3 | 6.00 |
| 13 (Comp.) | 161.3 | 43.00 |

Table 3 below presents the tensile strength of an embossed nonwoven coverweb alone and an elastic composite article using one or two layers of the embossed nonwoven coverweb. All data in Table 2 was generated using the tensile strength test described above.

TABLE 3

| Example No. | Coverweb Only (kg/cm) | Composite (kg/cm) |
| --- | --- | --- |
| 1 | 0.10 | 1.62 |
| 2 | 0.06 | 0.98 |
| 3 | 0.07 | 0.86 |
| 4 | 0.26 | 1.69 |
| 5 | 0.08 | 1.51 |
| 6 | 0.11 | 1.32 |
| 7 | 0.09 | 1.02 |
| 8 | 0.06 | 1.43 |
| 9 | 0.08 | 1.66 |
| 10 | 0.07 | 1.70 |
| 11 | 0.08 | 1.72 |
| 12 | 0.09 | 1.79 |
| 13 (Comp.) | 0.41 | 2.08 |

All references and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What invention claimed is:

1. An elastic composite article having a width, and a length greater than the width of the article, the article comprising:
   a nonwoven fibrous first coverweb comprising a down-web direction aligned with the length of the article and a cross-web direction transverse to the down-web direction;
   a tear pattern in the form of a plurality of separate and distinct weakened areas formed in the first coverweb, wherein the weakened areas comprise perforations formed through the first coverweb;
   a second coverweb attached to the first coverweb;
   a plurality of elastic filaments located between the first coverweb and the second coverweb, the plurality of elastic filaments aligned along the length of the article, wherein all of the elastic filaments located between the first coverweb and the second coverweb extend continuously over the entire length of the article.

2. An article according to claim 1, wherein the article is free of any woven or knitted webs.

3. An article according to claim 1, wherein the second coverweb comprises a nonwoven fibrous web, and wherein the elastic composite article comprises binder impregnating the first coverweb and the second coverweb.

4. An article according to claim 3, wherein the binder comprises cohesive binder material, wherein the elastic composite article comprises a cohesive elastic composite article.

5. An article according to claim 1, wherein the second coverweb is free of any tear pattern comprising a plurality of separate and distinct weakened areas.

6. An article according to claim 1, wherein the weakened areas comprise embossed areas.

7. An article according to claim 1, wherein the tear pattern comprises a plurality of rows of the weakened areas, wherein each row of the plurality of rows extends in the cross-web direction across the first coverweb, and wherein the rows are distributed along the down-web direction of the first coverweb.

8. An article according to claim 1, wherein, within the plurality of weakened areas, the weakened areas located adjacent each other across the cross-web direction of the first coverweb are separated by a land, and further wherein the ratio of a cross-web width of one of the adjacent weakened areas to a cross-web width of the land between the adjacent weakened areas is 1:1 or higher.

9. An article according to claim 1, wherein, within the plurality of weakened areas, the weakened areas located adjacent each other across the cross-web direction of the first coverweb are separated by a land, and further wherein the ratio of a cross-web width of one of the adjacent weakened areas to a cross-web width of the land between the adjacent weakened areas is 1.5:1 or higher.

10. An article according to claim 1, further comprising a pressure sensitive adhesive an at least one major surface of the elastic composite article.

11. An article according to claim 1, wherein the second coverweb comprises a nonwoven fibrous coverweb comprising a down-web direction aligned with the length of the article and a cross-web direction transverse to the down-web direction, and wherein the second coverweb further comprises a tear pattern in the form of a plurality of separate and distinct weakened areas formed in the second coverweb.

12. An elastic composite article having a width, and a length greater than the width of the article, the article comprising:
   a nonwoven fibrous first coverweb comprising a down-web direction aligned with the length of the article and a cross-web direction transverse to the down-web direction;
   a tear pattern in the form of a plurality of separate and distinct weakened areas formed in the first coverweb;
   a second coverweb attached to the first coverweb, wherein the second coverweb comprises a nonwoven fibrous coverweb comprising a down-web direction aligned with the length of the article and a cross-web direction transverse to the down-web direction, and wherein the second coverweb further comprises a tear pattern in the form of a plurality of separate and distinct weakened areas formed in the second coverweb, wherein the weakened areas of the first coverweb are not aligned with the weakened areas of the second coverweb;
   a plurality of elastic filaments located between the first coverweb and the second coverweb, the plurality of elastic filaments aligned along the length of the article, wherein each elastic filament of the plurality of elastic filaments extends continuously over the entire length of the article.

13. An article according to claim 12, wherein the weakened areas comprise embossed areas.

14. An article according to claim 12, wherein the weakened areas comprise perforations formed through the second coverweb.

15. An article according to claim 12, wherein the tear pattern in The second coverweb comprises a plurality of rows of the weakened areas, wherein each row of the plurality of rows extends in the cross-web direction across the second coverweb, and wherein the rows are distributed along the down-web direction of the second coverweb.

16. An article according to claim 12, wherein the first coverweb and the second coverweb are substantially identical.

17. An article according to claim 12, wherein the article is free of any woven or knitted webs.

18. An article according to claim 12, wherein the elastic composite article comprises binder impregnating the first coverweb and the second coverweb.

19. An article according to claim 18, wherein the binder comprises cohesive binder material, wherein the elastic composite article comprises a cohesive elastic composite article.

20. An article according to claim 12, wherein the tear pattern comprises a plurality of rows of the weakened areas, wherein each row of the plurality of rows extends in the cross-web direction across the first coverweb, and wherein the rows are distributed along the down-web direction of the first coverweb.

21. An article according to claim 12, wherein, within the plurality of weakened areas, the weakened areas located adjacent each other across the cross-web direction of the first coverweb are separated by a land, and further wherein the ratio of a cross-web width of one of the adjacent weakened areas to a cross-web width of the land between the adjacent weakened areas is 1:1 or higher.

22. An article according to claim 12, wherein, within the plurality of weakened areas, the weakened areas located adjacent each other across the cross-web direction of the first coverweb are separated by a land, and further wherein the ratio of a cross-web width of one of the adjacent weakened areas to a cross-web width of the land between the adjacent weakened areas is 1.5:1 or higher.

23. An article according to claim 12, further comprising a pressure sensitive adhesive on at least one major surface of the elastic composite article.

24. An elastic composite article having a width and a length greater than the width of the article, the article comprising:
   a nonwoven fibrous first coverweb comprising a down-web direction aligned with the length of the article and a cross-web direction transverse to the down-web direction;
   a tear pattern in the form of a plurality of separate and distinct weakened areas formed in the first coverweb, wherein the tear pattern comprises a plurality of rows of the weakened areas distributed along the down-web direction of the first coverweb, wherein each row of the weakened areas extends in the cross-web direction across the first coverweb, and wherein the weakened areas comprise perforations formed through the first coverweb;
   a nonwoven fibrous second coverweb;
   a plurality of elastic filaments extending in a direction along the length of the article, the plurality of elastic filaments located between the first coverweb and the second coverweb, wherein all of the elastic filaments located between the first coverweb and the second coverweb extend continuously over the entire length of the article; and
   binder impregnating the first coverweb and the second coverweb;
   wherein the article is free of any woven or knitted webs.

25. An article according to claim 24, wherein the article is free of any woven or knitted webs.

26. An article according to claim 24, wherein the binder comprises cohesive binder material, wherein the elastic composite article comprises a cohesive elastic composite article.

27. An article according to claim 24, wherein the second coverweb is free of any tear pattern comprising a plurality of separate and distinct weakened areas.

28. An article according to claim 24, wherein the weakened areas comprise embossed areas.

29. An article according to claim 24, wherein, within the plurality of weakened areas, the weakened areas located adjacent each other across the cross-web direction of the first coverweb are separated by a land, and further wherein the ratio of a cross-web width of one of the adjacent weakened areas to a cross-web width of the land between the adjacent weakened areas is 1:1 or higher.

30. An article according to claim 24, wherein, within the plurality of weakened areas, the weakened areas located adjacent each other across the cross-web direction of the first coverweb are separated by a land, and further wherein the ratio of a cross-web width of one of the adjacent weakened areas to a cross-web width of the land between the adjacent weakened areas is 1.5:1 or higher.

31. An article according to claim 24, further comprising a pressure sensitive adhesive on at least one major surface of the elastic composite article.

32. An article according to claim 24, wherein the second coverweb comprises a down-web direction aligned with the length of the article and a cross-web direction transverse to the down-web direction, and wherein the second coverweb further comprises a tear pattern in the form of a plurality of separate and distinct weakened areas formed in the second coverweb.

* * * * *

UNITED STATES PATENT AND TRADEMARK OFFICE
CERTIFICATE OF CORRECTION

PATENT NO. : 7,135,213 B2 Page 1 of 1
APPLICATION NO. : 10/632070
DATED : November 14, 2006
INVENTOR(S) : Robert J. Maki It is certified that error appears in the above-identified patent and that said Letters Patent is hereby corrected as shown below:

Column 10
Line 9, delete "1.5|" and insert in place thereof --1.5"--.

Column 15
Line 14, delete "an" and insert in place thereof --on--.
Line 55, delete "The" and insert in place thereof --the--.

Signed and Sealed this

Third Day of April, 2007

JON W. DUDAS
*Director of the United States Patent and Trademark Office*